(12) United States Patent
Jang et al.

(10) Patent No.: US 12,336,511 B2
(45) Date of Patent: Jun. 24, 2025

(54) LEAD ADJUSTMENT APPARATUS CONTROLLED ACCORDING TO DIFFERENT FORCES FOR EACH DIRECTION

(71) Applicant: FIRSPURT INC, Seoul (KR)

(72) Inventors: Yong Joon Jang, Seoul (KR); Shin Woong Park, Seoul (KR)

(73) Assignee: FIRSPURT INC, Seoul (KR)

( * ) Notice: Subject to any disclaimer, the term of this patent is extended or adjusted under 35 U.S.C. 154(b) by 0 days.

(21) Appl. No.: 18/289,797

(22) PCT Filed: Jul. 5, 2021

(86) PCT No.: PCT/KR2021/008477
§ 371 (c)(1),
(2) Date: Nov. 7, 2023

(87) PCT Pub. No.: WO2023/277228
PCT Pub. Date: Jan. 5, 2023

(65) Prior Publication Data
US 2024/0260546 A1   Aug. 8, 2024

(30) Foreign Application Priority Data

Jul. 1, 2021  (KR) .......................... 10-2021-0086568

(51) Int. Cl.
*A01K 27/00*   (2006.01)
(52) U.S. Cl.
CPC .................. *A01K 27/004* (2013.01)
(58) Field of Classification Search
CPC .......................... A01K 27/004; A01K 27/003
See application file for complete search history.

(56) References Cited

U.S. PATENT DOCUMENTS

| 2014/0263799 A1* | 9/2014 | Baerwald ............. A01K 27/004 |
| | | 242/381.5 |
| 2016/0081306 A1* | 3/2016 | Fikfak ................ B65H 75/4447 |
| | | 119/796 |
| 2021/0037791 A1* | 2/2021 | Park ..................... A01K 27/004 |

FOREIGN PATENT DOCUMENTS

| JP | 2007-185161 A | 7/2007 |
| KR | 10-2011-0002359 U | 3/2011 |

(Continued)

OTHER PUBLICATIONS

International Search Report for PCT/KR2021/008477 mailed on Mar. 23, 2022.

*Primary Examiner* — Kristen C Hayes
(74) *Attorney, Agent, or Firm* — The PL Law Group, PLLC (57) ABSTRACT

A lead adjustment apparatus includes a cover portion including locking means, a rotating member around which a lead is wound, latches coupled to the rotating member, and rotating with respect to the same axis as the rotating member when force of a preset range is applied to the lead, and opened so as to be locked into some of the locking means, an elastic member allowing the latches to be gathered together, and a spiral spring adding a rotational force to the rotating member such that the lead is wound. The latches are controlled by the elastic member to be locked into some of the locking means when the lead is unwound and not to be locked into the locking means when the lead is wound. Accordingly, the lead may be controlled differently with respect to each of cases where the lead is wound and the lead is unwound.

12 Claims, 7 Drawing Sheets

(56) References Cited

FOREIGN PATENT DOCUMENTS

| KR | 10-2013-0021041 A | 3/2013 |
|---|---|---|
| KR | 10-2043096 B1 | 11/2019 |
| KR | 10-2088031 B1 | 3/2020 |

* cited by examiner

LEAD ADJUSTMENT APPARATUS CONTROLLED ACCORDING TO DIFFERENT FORCES FOR EACH DIRECTION

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/008477, filed Jul. 5, 2021, which claims priority to the benefit of Korean Patent Application No. 10-2021-0086568 filed in the Korean Intellectual Property Office on Jul. 1, 2021, the entire contents of which are incorporated herein by reference.

BACKGROUND

1. Technical Field

The present disclosure relates to a lead adjustment apparatus controlled according to different forces for each direction, and more specifically, to a lead adjustment apparatus controlled according to different forces for each direction in which a lead is controllable differently for each direction without separate user manipulation.

2. Background Art

In modern times, a family form tends to change from a large family to a small family with a small number of family members, and with the small family, the number of families raising companion animals tends to be significantly increasing.

Accordingly, people often go out with their companion animals, and at this time, a lead is generally used to control the movement of a companion animal in order to prevent the companion animal from interfering with the passage of others or to prevent an accident in which the companion animal attacks others.

However, in most cases, a user must hold a lead adjustment apparatus and directly control the lead adjustment apparatus by pressing a button to extend, shorten, or fix the lead connected to the companion animal.

Accordingly, the user must always keep an eye on the movement of the companion animal, and when the companion animal suddenly tries to run away, the user must quickly control the lead adjustment apparatus to pull or fix the lead in order to prevent the companion animal from running away. Therefore, from the user's perspective, there was the inconvenience of always having to carry the lead adjustment apparatus and having to quickly respond to various emergency situations that may occur.

In this regard, a lead adjustment apparatus attachable to a companion animal has been developed to eliminate the inconvenience of a user having to always carry the lead adjustment apparatus. Although when the companion animal suddenly moves away from the user, a function of automatically controlling the lead to be fixed is convenient, even when the companion animal is closer to the user, the lead is controlled to be automatically fixed, which caused a problem in that it is difficult to control the companion animal because the lead is fixed at an extended length.

Accordingly, the need for technology capable of controlling a lead differently with respect to each of cases where the lead is wound and the lead is unwound has increased.

SUMMARY

An object of the present disclosure is to provide a lead adjustment apparatus controlled according to different forces for each direction in which a lead is controlled differently with respect to each of cases where the lead is wound and the lead is unwound when force of a preset range is applied to the lead.

According to an embodiment of the present disclosure, a lead adjustment apparatus controlled according to different forces for each direction include a cover portion including a plurality of locking means, a rotating member around which a lead is wound, a plurality of latches coupled to one side of the rotating member, and rotating with respect to the same axis as the rotating member when force of a preset range is applied to the lead, and opened so as to be locked into some of the plurality of locking means, an elastic member allowing the plurality of latches to be gathered together, and a spiral spring adding a rotational force to the rotating member such that the lead is wound, wherein the plurality of latches are controlled by the elastic member to be locked into some of the plurality of locking means when the lead is unwound and not to be locked into the plurality of locking means when the lead is wound.

The elastic member may include a first elastic body and a second elastic body having different elastic forces, and an elastic force of the first elastic body may be greater than an elastic force of the second elastic body.

The plurality of latches may include a first latch disposed in contact with the first elastic body and having a shape locked into some of the plurality of locking means when the lead is wound, and a second latch disposed in contact with the second elastic body and having a shape locked into some of the plurality of locking means when the lead is unwound, an opening of the first latch may be controlled by the first elastic body, and an opening of the second latch may be controlled by the second elastic body.

A case where force of the preset range is applied to the lead may be one of cases where a rotational force of the preset range by the spiral spring is applied to the lead and force of the preset range to unwind the lead is applied to the lead.

When force of the preset range is applied to the lead, the rotating member may rotate to generate a centrifugal force, and each of the first and second latches may be opened in response to the generated centrifugal force, and the first latch may be opened less than the second latch due to the elastic force of the first elastic body.

When force of the preset range is applied to the lead, the first latch may be opened within a range not to be locked into the plurality of locking means, and the second latch may be opened so as to be locked into some of the plurality of locking means.

In case where the rotational force of the preset range by the spiral spring is applied to the lead, the opening of the first latch may be controlled by the first elastic body so that the first latch is opened within the range not to be locked into the plurality of locking means, and in case where force of the preset range to unwind the lead is applied to the lead, the opening of the second latch may be controlled by the second elastic body so that the second latch is opened so as to be locked into some of the plurality of locking means.

In case where force of the preset range to unwind the lead is applied to the lead, when the second latch is locked into some of the plurality of locking means, the rotating member may stop rotating in a rotation direction in which the lead is unwound.

The first latch may not be locked into the plurality of locking means, and the rotating member may be rotatable in an opposite direction to the rotation direction.

When the rotating member stops rotating in the rotation direction and then rotates in the opposite direction, the first latch and the second latch may be gathered by the elastic member.

When the first latch and the second latch are gathered together by the elastic member, the rotating member may be freely rotatable in the rotation direction and the opposite direction.

When the rotational force of the preset range by the spiral spring is applied to the lead, the first latch may be opened within the range not to be locked into the plurality of locking means so that the rotating member continues to rotate in the direction in which the lead is wound.

When the rotational force exceeding the preset range by the spiral spring is applied to the lead, the first latch may be opened so as to be locked into some of the plurality of locking means, and when the first latch is locked into some of the plurality of locking means, the rotating member may stop rotating in the rotation direction in which the lead is wound.

As set forth above, the lead may be controlled differently with respect to each of cases where the lead is wound and the lead is unwound, thereby satisfying user needs and user convenience.

DETAILED DESCRIPTION

Hereinafter, embodiments of the present disclosure are described in more detail with reference to the accompanying drawings. Further, in describing the embodiments of the present disclosure, omitted is a detailed description of a case where it is decided that the detailed description for the known functions or configurations related to the present disclosure may unnecessarily obscure the gist of the present disclosure. Furthermore, the terms used herein are defined in consideration of the functions in the embodiments of the present disclosure, and may be construed in different ways by intentions of users or operators, practices, or the like. Therefore, the terms should be defined on the basis of the contents throughout the specification.

Figure 1:
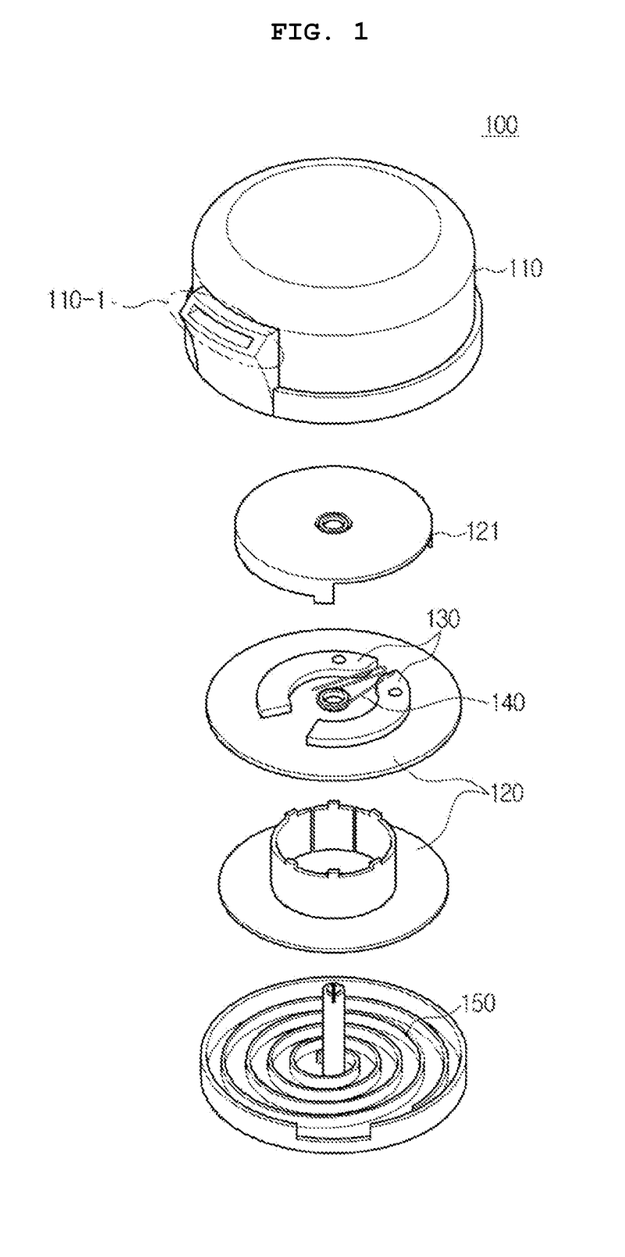
FIG. 1 is a diagram showing a configuration of a lead adjustment apparatus controlled according to different forces for each direction according to an embodiment of the present disclosure.

FIG. 1 is a diagram showing a configuration of a lead adjustment apparatus controlled according to different forces for each direction according to an embodiment of the present disclosure.

Referring to FIG. 1, a lead adjustment apparatus 100 controlled according to different forces for each direction includes a cover portion 110, a rotating member 120, a plurality of latches 130, an elastic member 140, and a spiral spring 150. Here, the lead adjustment apparatus 100 controlled according to different forces for each direction is manufactured in a predetermined size, may be changed variously in size thereof depending on the purpose of use, the size of a companion animal, and the type and length of the lead, and is a case in which an operating space portion is formed inside. The operating space portion may include the rotating member 120, the plurality of latches 130, the elastic member 140, and the spiral spring 150, and may further include an inner cover 121 functioning as a guide to prevent the plurality of latches 130 from separating.

In addition, a housing of the lead adjustment apparatus 100 controlled according to different forces for each direction may be implemented with various materials, for example, plastic, silicon, metal, ceramics, rubber, wood, etc. In addition, the shape of the lead adjustment apparatus 100 controlled according to different forces for each direction is not limited to a cylindrical shape as shown in FIG. 1, and may be implemented in various shapes such as a square, a hexagon, etc.

The cover portion 110 may include a plurality of locking means. Here, the cover portion 110 may be implemented in a size capable of covering some or all of components of the companion animal lead adjustment apparatus 100, and may be implemented in various materials or shapes as described above. In addition, an entrance 110-1 is formed in the cover portion 110 to allow the lead to enter and exit the inside of the companion animal lead adjustment apparatus 100. Here, a surface in which the entrance 110-1 is formed is inclined at a certain angle, and thus, the influence of interference that may occur when the lead enters and exits through the entrance 110-1 may be minimized.

That is, when the surface in which the entrance 110-1 is formed is not inclined and forms an '¬'-shaped structure, and the lead is pulled in a more upward direction, the influence of interference between the lead and the entrance 110-1 may be increased. On the other hand, when the surface in which the entrance 110-1 is formed is inclined at 45°, and an allowable range of an entry and exit direction of the lead increases, that is, the lead is pulled more upward or more downward, the influence of interference between the lead and the entrance 110-1 may be minimized.

Figure 4:
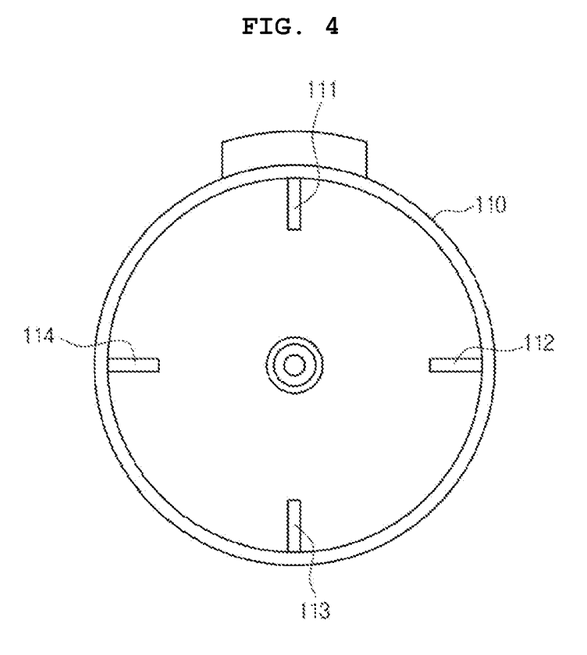
FIG. 4 is a diagram showing a locking means provided on a cover portion according to an embodiment of the present disclosure.

Meanwhile, as shown in FIG. 4, a plurality of locking means 111, 112, 113, and 114 are provided inside the cover portion 110. Here, the plurality of locking means 111, 112, 113, and 114 may be implemented in a structure protruding toward the inside of the cover portion 110 so that the plurality of latches 130 may be locked while rotating. In FIG. 4, the plurality of locking means 111, 112, 113, and 114 are implemented in the shape of four protrusions, but this is only shown as an example, and the number and shape of the locking means may be changed as much as desired.

Specifically, the plurality of locking means 111, 112, 113, and 114 shown in FIG. 4 are four in total and disposed at intervals of 90°. For example, when the plurality of locking means are six in total, the six locking means may be disposed at intervals of 60°.

Some of the plurality of latches 130 may be locked into some of the plurality of locking means 111, 112, 113, and 114 so that the plurality of locking means 111, 112, 113, and 114 may limit the rotation of the rotating member 120, and more specifically, the plurality of locking means 111, 112, 113, and 114 may limit the rotation of the rotating member 120, so that the lead is no longer stretched or the lead is no longer wound.

The rotating member 120 may be implemented in a form in which the lead may be wound, and the lead is wound therearound. Here, the rotating member 120 just needs to be in the form that the lead may be wound, and implemented in a cylindrical shape in FIG. 1, but is not limited thereto.

In addition, in FIG. 1, the rotating member 120 is shown as a configuration in which a disk to which the plurality of latches 130 are coupled and a cylindrical member with a support are combined, but may be implemented as a single structure other than such a combined structure.

Meanwhile, the length, thickness, width, and material of the lead may be changed depending on the size and purpose of the companion animal.

The plurality of latches 130 may be coupled to one side of the rotating member 120 and rotate with respect to the same axis as the rotating member 120 when force of a preset range is applied to the lead and may be opened so as to be locked into some of the plurality of locking means 111, 112, 113, and 114.

Specifically, the plurality of latches 130 may be coupled to one side of the rotating member 120, and one side to which the plurality of latches 130 are coupled is perpendicular to a rotation axis of the rotating member 120.

Accordingly, when force of the preset range is applied to the lead, the lead is wound or unwound in response to force, and accordingly, the rotating member 120 rotates in a direction in which the lead is wound or unwound, and the plurality of latches 130 coupled to one side of the rotating member 120 also rotate in the same direction as the rotating member 120 with respect to the same axis as the rotating member 120.

At this time, the plurality of latches 130 are opened while rotating, and some of the plurality of opened latches 130 are locked into some of the plurality of locking means 111, 112, 113, and 114 provided on the cover portion 110.

Specifically, when force of the preset range is applied to the lead, a centrifugal force is generated as the rotating member 120 rotates, and the plurality of latches 130 may be opened in response to the generated centrifugal force.

That is, an angle at which the plurality of latches 130 are opened may be changed in response to the magnitude of the generated centrifugal force, and as the magnitude of the generated centrifugal force increases, the angle at which the plurality of latches 130 are opened increases.

As described above, the angle at which the plurality of latches 130 are opened may be changed in response to the magnitude of the generated centrifugal force. At this time, the angle of the plurality of latches 130 may be controlled by the elastic member 140.

Here, the elastic member 140 serves to allow the plurality of latches 130 to gather when there is no centrifugal force, that is, when the rotating member 120 does not rotate. A detailed description of the elastic member 140 will be given below.

Meanwhile, the spiral spring 150 may add a rotational force so that the lead is wound around the rotating member 120. In other words, the spiral spring 150 is implemented to provide an elastic force in a direction in which the lead is wound, and when a user pulls the lead in a direction in which the lead is unwound, provide the elastic force in the direction in which the lead is wound, so that tension is loaded on the lead.

On the other hand, the plurality of latches 130 may be controlled by the elastic member 140 to be locked into some of the plurality of locking means 111, 112, 113, and 114 when the lead is unwound, and not to be locked into the plurality of locking means 111, 112, 113, and 114 when the lead is wound.

Specifically, when the lead is unwound, that is, when the lead is stretched, such as when the companion animal runs away from the user, the plurality of latches 130 are locked into some of the plurality of locking means 111, 112, 113, and 114, and thus, the lead is no longer stretched, but when the lead is wound, that is, when the lead is shortened, such as when the companion animal runs in a direction close to the user, the plurality of latches 130 are not locked into the plurality of locking means 111, 112, 113, and 114, and thus, the lead may be continuously wound around the rotating member 120 without being unnecessarily fixed.

As described above, when force of the preset range is applied to the lead, operations in which the plurality of latches 130 are locked into some of the plurality of locking means 111, 112, 113, and 114 when the lead is unwound, but are not locked into some of the plurality of locking means 111, 112, 113, and 114 when the lead is wound may be controlled by the elastic member 140. The elastic member 140 will be described in detail below.

Figure 2:
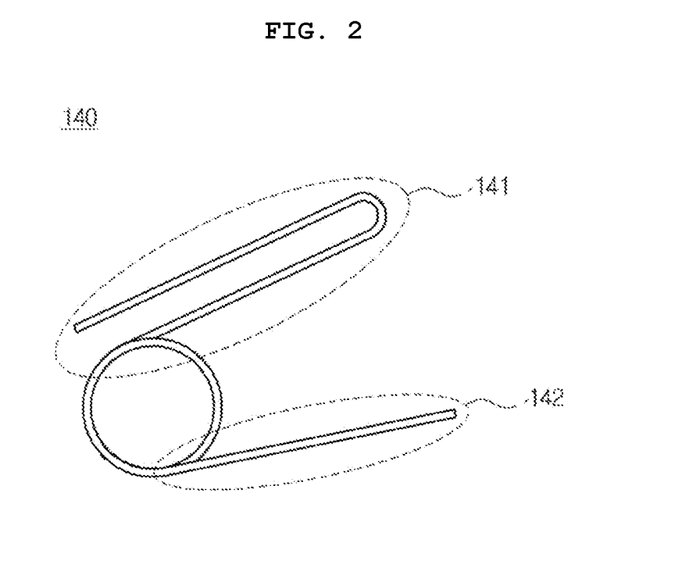
FIG. 2 is a diagram showing an elastic member according to an embodiment of the present disclosure.

FIG. 2 is a diagram showing an elastic member according to an embodiment of the present disclosure.

Referring to FIG. 2, the elastic member 140 according to an embodiment of the present disclosure includes a first elastic body 141 and a second elastic body 142 which have different elastic forces. Also, the elastic force of the first elastic body 141 is greater than the elastic force of the second elastic body 142.

In FIG. 2, the first elastic body 141 is implemented as an elastic body of two strands in which one elastic body bends and overlaps, and accordingly, the elastic force of the first elastic body 141 is further increased.

In comparison, the second elastic body 142 is implemented as an elastic body of a single strand, and has a relatively small elastic force compared to the first elastic body 141.

Meanwhile, in FIG. 2, the first elastic body 141 and the second elastic body 142 are shown as being implemented as the elastic body of two strands and the elastic body of the single strand, respectively, but are not limited thereto, and the first elastic body 141 may be made of a material with a high elastic modulus, and the second elastic body 142 may be made of a material with a relatively low elastic modulus.

As such, the elastic member 140 according to an embodiment of the present disclosure includes the first elastic body 141 and the second elastic body 142 made of structures or materials having different elastic forces or elastic moduli.

In addition, the plurality of latches 130 include a first latch and a second latch, which will be described with reference to FIG. 3.

Figure 3:
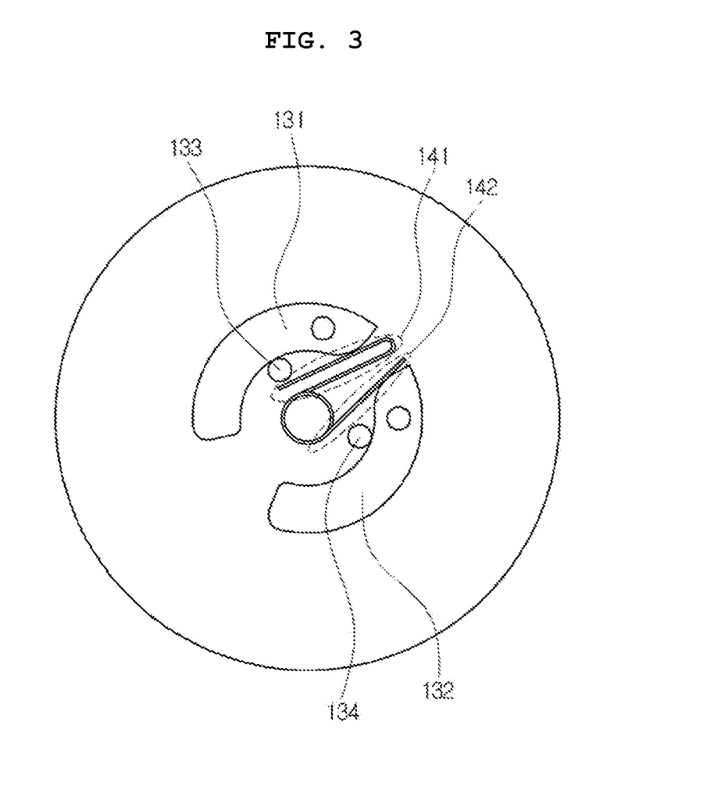
FIG. 3 is a diagram showing the elastic member and a plurality of latches according to an embodiment of the present disclosure.

FIG. 3 is a diagram showing an elastic member and a plurality of latches according to an embodiment of the present disclosure.

Referring to FIG. 3, the plurality of latches 130 include a first latch 131 disposed to be in contact with the first elastic body 141 and having a shape locked into some of the plurality of locking means 111, 112, 113, and 114 when the lead is wound, and a second latch 132 disposed to be in contact with the second elastic body 142 and having a shape locked into some of the plurality of locking means 111, 112, 113, and 114 when the lead is unwound.

In addition, the opening of the first latch 131 may be controlled by the first elastic body 141, and the opening of the second latch 132 may be controlled by the second elastic body 142.

That is, when the first latch 131 is opened outward by a centrifugal force, one end of the first latch 131 in contact with the first elastic body 141 presses the first elastic body 141, and thus, when the elastic force of the first elastic body 141 is strong, one end of the first latch 131 may not strongly press the first elastic body 141, so that an opening angle decreases, and when the elastic force of the first elastic body 141 is weak, one end of the first latch 131 may strongly press the first elastic body 141, so that the opening angle increases. Operation processes between the second latch 132 and the second elastic body 142 are also the same.

Specifically, the first latch 131 is in contact with the first elastic body 141 having a stronger elastic force than that of the second elastic body 142, and accordingly, the opening angle of the first latch 131 due to the elastic force of the first elastic body 141 is inevitably smaller than that of the second latch 132.

Likewise, the second latch 132 is in contact with the second elastic body 142 having a weaker elastic force than that of the first elastic body 141, and accordingly, the opening angle of the second latch 132 due to the elastic force of the second elastic body 142 is inevitably larger than that of the first latch 131.

As describe above, the opening angle of the first latch 131 is controlled by the elastic force of the first elastic body 141, and the opening angle of the second latch 132 is controlled by the elastic force of the second elastic body 142.

Meanwhile, referring to FIG. 3, a first fixing portion 133 fixing the first latch 131 so as not to be closed any more even if the first latch 131 is closed by the first elastic body 141, and a second fixing portion 134 fixing the second latch 132 so as not to be closed any more even if the second latch 132 is closed by the second elastic body 142 may be provided in the rotating member 120.

Meanwhile, FIG. 4 is a diagram showing locking means provided on a cover portion according to an embodiment of the present disclosure. The locking means 111, 112, 113, and 114 provided on the cover portion 110 are explained together in FIG. 1, and thus, detailed descriptions thereof are omitted.

On the other hand, a case where force of a preset range is applied to the lead means one of cases where a rotational force of the preset range by the spiral spring 150 is applied to the lead, and force of the preset range to unwind the lead is applied to the lead.

For example, assuming that a user suddenly loses the lead held in the user's hand while the lead is unwound because the user is at a distance from the companion animal, first, if the lead is unwound because the user is at the distance from the companion animal, the elastic force of the spiral spring 150 gradually increases in a direction in which the lead is wound around the rotating member 120 as the lead is unwound, and when the user suddenly loses the lead held in the user's hand while the elastic force is increased as above, the spiral spring 150 strongly adds the rotational force to the rotating member 120 to cause the lead to be wound around the rotating member 120 due to the elastic force.

Also, when the rotational force is enough to open the plurality of latches 130 to the extent that the plurality of latches 130 may be locked into the plurality of locking means 111, 112, 113, and 114, it may be seen that force of the preset range is applied to the lead.

The plurality of latches 130 according to an embodiment of the present disclosure may be controlled so as not to be locked into the plurality of locking means 111, 112, 113, and 114 by the elastic member 140 even when the rotational force of the preset range by the spiral spring 150 is applied to the lead.

In addition, for example, assuming that the companion animal suddenly moves in a direction away from the user or that the user suddenly pulls the lead, these both cases correspond to cases where the lead is suddenly unwound from the rotating member 120, and at this time, force that causes the lead to be unwound from the rotating member 120 may be strongly applied to the rotating member 120.

In addition, when force that causes the lead to be unwound from the rotating member 120 is at least enough to open the plurality of latches 130 to the extent that the plurality of latches 130 may be locked into the plurality of locking means 111, 112, 113, and 114, it may be seen that force of the preset range is applied to the lead.

In other words, as in the above-described example, the case where force of the preset range is applied to the lead may include both cases where force of the preset range is applied in the direction in which the lead is unwound, or force of the preset range is applied in the direction in which the lead is wound.

On the other hand, when force of the preset range is applied to the lead, the rotating member 120 rotates to generate the centrifugal force, and each of the first latch 131 and the second latch 132 is opened in response to the generated centrifugal force, and due to the elastic force of the first elastic body 141, the first latch 131 is opened less than the second latch 132.

As described above, this is because the elastic force of the first elastic body 141 is relatively stronger than that of the second elastic body 142, even if the first latch 131 is opened by the generated centrifugal force, when a part of the opened first latch 131 in contact with the first elastic body 141 is pressed, because the first elastic body 141 tries to be restored by the elastic force, the opening angle of the first latch 131 is limited by the first elastic body 141.

In contrast, because the elastic force of the second elastic body 142 is relatively weak compared to the first elastic body 141, the second latch 132 is opened by the generated centrifugal force, when a part of the opened second latch 132 in contact with the second elastic body 142 is pressed, the restoring force of the second elastic body 142 to be restored by the elastic force is weak compared to the first elastic body 141, so that the opening angle of the second latch 132 is larger than that of the first latch 131 by the second elastic body 142.

Accordingly, when force of the preset range is applied to the lead, the first latch 131 is opened within a range so as not to be locked into the plurality of locking means 111, 112, 113, and 114, and the second latch 132 is opened so as to be locked into some of the plurality of locking means 111, 112, 113, and 114.

Figure 5A:
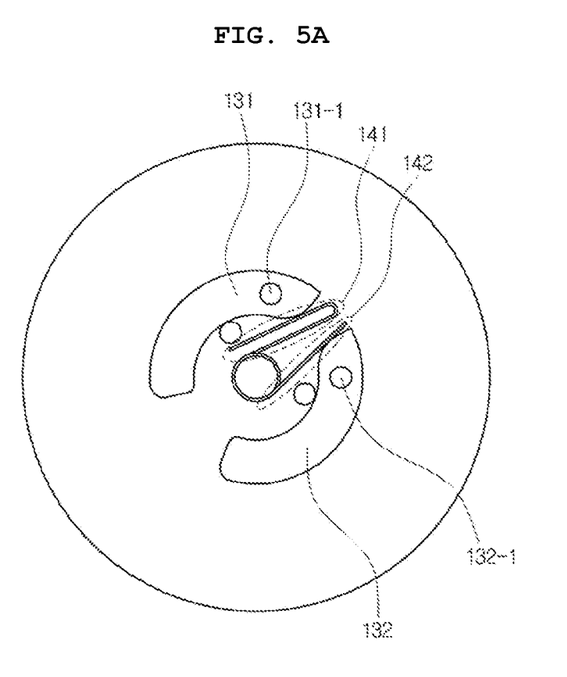
FIGS. 5A and 5B are diagrams showing operations of the plurality of latches provided on a rotating member according to an embodiment of the present disclosure.
Figure 5B:
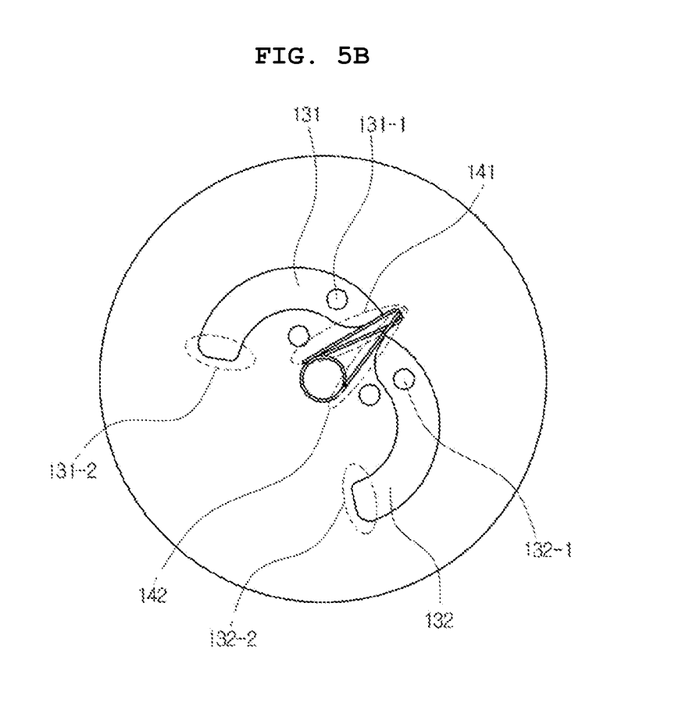

FIGS. 5A and 5B are diagrams showing operations of a plurality of latches provided on a rotating member according to an embodiment of the present disclosure.

Referring to FIG. 5A, one end of each of the first latch 131 and the second latch 132 is coupled to the rotating member 120 through pins 131-1 and 132-1 so that the first latch 131 and the second latch 132 may move.

That is, only one end of each of the first latch 131 and the second latch 132 is coupled to the rotating member 120 through the pins 131-1 and 132-1, so that the first latch 131 and the second latch 132 respectively move with respect to the pins 131-1 and 132-1, and one end of the first latch 131 and one end of the second latch 132 are respectively fixed to the pins 131-1 and 132-1, so that the other ends 131-2 and 132-2 of the first latch 131 and the second latch 132 are forced to move away in a direction corresponding to the centrifugal force.

On the other hand, as shown in FIG. 5A, while there is no rotation of the rotating member 120, the first latch 131 and the second latch 132 respectively remain gathered together by the first elastic body 141 and the second elastic body 142.

However, as shown in FIG. 5B, when force of the preset range is applied to the lead, the centrifugal force generated by the rotation of the rotating member 120 is more strongly applied to each of the first latch 131 and the second latch 132 than the elastic force of the first elastic body 141 and the second elastic body 142 that causes the first latch 131 and the second latch 132 to gather together so that despite the elastic force of the first elastic body 141 and the second elastic body 142, each of the first latch 131 and the second latch 132 is opened as shown in FIG. 5B. As described above, because the elastic force of the first elastic body 141 is greater than the elastic force of the second elastic body 142, there is a difference in the opening angle of the first latch 131 with respect to the pin 131-1 and the opening angle of the second latch 132 with respect to the pin 131-2, and there is also a difference in the distance of the other end 131-2 of the first latch 131 and the distance of the other end 132-2 of the second latch 132 moving in a direction corresponding to the centrifugal force.

In addition, as the first latch 131 and the second latch 132 are opened in response to the centrifugal force, the first elastic body 141 and the second elastic body 142 are also closed to each other.

When the rotation of the rotating member 120 stops, the elastic force of the first elastic body 141 and the elastic force of the second elastic body 142 are respectively applied to the first latch 131 and the second latch 132 again, so that the first latch 131 and the second latch 132 are each gathered together as shown in FIG. 5A.

On the other hand, when the rotational force of the preset range by the spiral spring 150 is applied to the lead, the opening of the first latch 131 is controlled by the first elastic body 141 so that the first latch 131 is opened within a range not to be locked into the plurality of locking means 111, 112, 113, and 114, and when force of the preset range to unwind the lead is applied to the lead, the opening of the second latch 132 is controlled by the second elastic body 142 so that the second latch 132 is opened so as to be locked into some of the plurality of locking means 111, 112, 113, and 114.

That is, assuming that the case where the rotating member 120 rotates clockwise in FIG. 5B is a case where the lead is unwound, when force of the preset range is applied in the direction in which the lead is unwound, as shown in FIG. 5B, the first latch 131 is opened less than the second latch 132 by the first elastic body 141 within a range not to be locked into the plurality of locking means 111, 112, 113, and 114, and the second latch 132 is opened wider than the first latch 131 by the second elastic body 142 so as to be locked into some of the plurality of locking means 111, 112, 113, and 114.

On the other hand, when force of the preset range to unwind the lead is applied to the lead, when the second latch 132 is locked into some of the plurality of locking means 111, 112, 113, and 114, the rotating member 120 stops rotating in a rotation direction in which the lead is unwound.

Figure 6A:
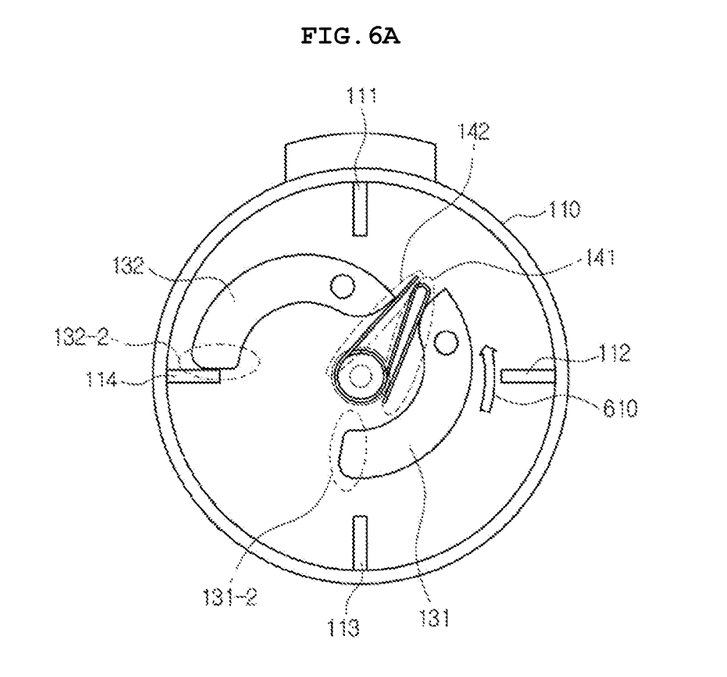
FIGS. 6A and 6B are diagrams showing operations of the plurality of latches when a lead is unwound and when the lead is wound according to an embodiment of the present disclosure.
Figure 6B:
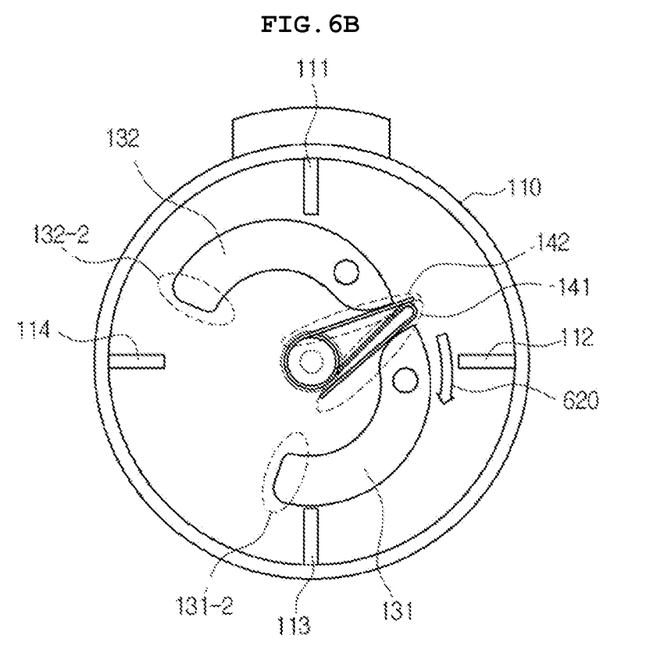

FIGS. 6A and 6B are diagrams showing operations of a plurality of latches when the lead is unwound and when the lead is wound according to an embodiment of the present disclosure.

FIG. 6A is a diagram for explaining the second latch 132 locked into some of the plurality of locking means 111, 112, 113, and 114 when the inside of the cover portion 110 is viewed from bottom to top.

Specifically, assuming that a rotation direction in which the rotating member 120 rotates clockwise is a direction in which the lead is unwound, when the inside of the cover portion 110 is viewed from bottom to top, the direction in which the lead is unwound is a counterclockwise direction 610 shown in FIG. 6A.

In addition, when the first latch 131 and the second latch 132 rotate with the rotating member 120 in the counterclockwise direction 610, that is, in the direction in which the lead is unwound, but when force of a preset range is applied to the lead, the second latch 132, the opening of which is controlled by the second elastic body 142, is opened wider than the first latch 131, the opening of which is controlled by the first elastic body 141, and accordingly, the other end 132-2 of the second latch 132 is locked into the locking means 114 among the plurality of locking means 111, 112, 113, and 114, and the first latch 131 and the second latch 132 and the rotating member 120 stop rotating in the direction in which the lead is unwound.

On the other hand, the first latch 131, the opening of which is controlled by the first elastic body 141, is opened less than the second latch 132, the opening of which is controlled by the second elastic body 142, and accordingly, the other end 131-2 of the first latch 131 is opened within a range not to be locked into the plurality of locking means 111, 112, 113, and 114, so that the first latch 131 is not locked into the plurality of locking means 111, 112, 113, and 114.

Accordingly, as a result, when force of a preset range is applied to the lead in the direction in which the lead is unwound, the second latch 132 is locked into some of the plurality of locking means 111, 112, 113, and 114 so that rotation stops in the direction in which the lead is unwound.

Also, similarly, FIG. 6B is a diagram for explaining the first latch 131 and the second latch 132 which are not locked into the plurality of locking means 111, 112, 113, and 114 when the inside of the cover portion 110 is viewed from bottom to top.

Specifically, assuming that the rotation direction in which the rotating member 120 rotates in a counterclockwise direction is the direction in which the lead is wound, when the inside of the cover portion 110 is viewed from bottom to top, the direction in which the lead is wound is a clockwise direction 620 as shown in FIG. 6B.

In addition, when the first latch 131 and the second latch 132 rotate with the rotating member 120 in the clockwise direction 620, that is, in the direction in which the lead is wound, but when force of a preset range is applied to the lead, the first latch 131, the opening of which is controlled by the first elastic body 141, is opened less than the second latch 132, the opening of which is controlled by the second elastic body 142, and accordingly, the other end 131-2 of the first latch 131 is opened within a range not to be locked into the plurality of locking means 111, 112, 113, and 114, so that the first latch 131 is not locked into the plurality of locking means 111, 112, 113, and 114.

In addition, the second latch 132, the opening of which is controlled by the second elastic body 142, is opened larger than the first latch 131, the opening of which is controlled by the first elastic body 141, but because the second latch 132 has a shape to be locked into some of the plurality of locking means 111, 112, 113, and 114 when the lead is unwound, even if the second latch 132 is opened widely, the second latch 132 is not locked into the plurality of locking means 111, 112, 113, and 114 in the rotation direction 620 corresponding to the case where the lead is wound.

Accordingly, as a result, when force of a preset range is applied to the lead in the direction in which the lead is wound, neither the first latch 131 nor the second latch 132 is locked into the plurality of locking means 111, 112, 113, and 114, so that rotation in the direction in which the lead is wound may continue without stopping.

That is, when the rotational force of a preset range by the spiral spring 150 is applied to the lead, the first latch 131 is opened within a range not to be locked into the plurality of locking means 111, 112, 113, and 114, so that the rotating member 120 may continue to rotate in the direction in which the lead is wound.

Therefore, with respect to use of the lead adjustment apparatus 100 controlled according to different forces for each direction, when the companion animal suddenly moves away from the user, that is, when the lead is unwound, force of a preset range is applied to the lead, the rotation of the first latch 131, the second latch 132, and the rotating member 120 stops, the lead is fixed without stretching any further, and thus, the user may control the companion animal no longer to move away.

In addition, when the companion animal is closer to the user, that is, when the lead is wound, the rotation of the first latch 131, the second latch 132, and the rotating member 120 may continue even if force of a preset range is applied the lead, thereby preventing a phenomenon in which the rotation of the first latch 131, the second latch 132, and the rotating member 120 stops unnecessarily, causing the lead not to be wound while being unnecessarily fixed.

Meanwhile, in a case where the elastic member 140 according to an embodiment of the present disclosure, that is, the elastic member 140 including the first elastic body 141 and the second elastic body 142 having different elastic forces, is not used, and an elastic member such as a general spring having no difference in the elastic force is used, the rotation of the rotating member 120 stops when force of a preset range is applied to the lead in both cases where the lead is wound and the lead is unwound, and when the lead is stretched, stopping the rotation of the rotating member 120 is not a big problem, but stopping the rotation of the rotating member 120 until the lead is wound causes inconvenience.

In particular, in case where the lead is wound, as a result of experimenting a winding speed and a moving distance with respect to a lead adjustment apparatus including a first elastic body and a second elastic body having no difference in the elastic force and a lead adjustment apparatus including a first elastic body and a second elastic body having a difference in the elastic force, the effects shown in Table 1 below may be identified.

TABLE 1

| In case where lead is wound | Lead adjustment apparatus including first elastic body and second elastic body having no difference in elastic force | Lead adjustment apparatus including first elastic body and second elastic body having difference in elastic force |
| --- | --- | --- |
| Winding length | 1200 mm | 1200 mm |
| Winding time | 1.4 s | 0.9 s |
| Winding speed | 857 mm/s | 1333 mm/s |
| Moving distance within 1 second | 600 mm | 1200 mm |

That is, it may be seen that in case where the lead is wound, the lead adjustment apparatus including the first elastic body and the second elastic body having the difference in the elastic force is much faster than the lead adjustment apparatus including the first elastic body and the second elastic body having no difference in the elastic force in terms of the winding speed with respect to the winding time of 1.4 seconds and 0.9 seconds, respectively, at the same length of the wound lead of 1200 mm.

In addition, the winding speed of the lead adjustment apparatus including the first elastic body and the second elastic body having the difference in the elastic force is 1333 mm/s, and the winding speed of the lead adjustment apparatus including the first elastic body and the second elastic body having no difference in the elastic force is 857 mm/s, so that it may be seen that the lead adjustment apparatus including the first elastic body and the second elastic body having the difference in the elastic force is much faster in terms of the winding speed.

In addition, it may be seen that the lead adjustment apparatus including the first elastic body and the second elastic body having no difference in the elastic force having the moving distance of the lead within 1 second of 600 mm is two times different from the lead adjustment apparatus including the first elastic body and the second elastic body having the difference in the elastic force having the moving distance of the lead within 1 second of 1200 mm.

In other words, in the case where the lead is wound, rotation stops in the lead adjustment apparatus including the first elastic body and the second elastic body having no difference in the elastic force, and thus, the winding time is relatively long, the winding speed is low, and the moving distance of the lead within 1 second is short.

In contrast, in the case where the lead is wound, rotation does not stop and continues in the lead adjustment apparatus including the first elastic body and the second elastic body having the difference in the elastic force, and thus, the winding time is relatively short, the winding speed is high, and the moving distance of the lead within 1 second is also long.

On the other hand, as shown in FIG. 6A, even when force of a preset range is applied to the lead in the direction in which the lead is unwound, the second latch 132 is locked into some of the plurality of locking means 111, 112, 113, and 114, and rotation stops in the direction in which the lead is unwound, the first latch 131 is not locked into the plurality of locking means 111, 112, 113, and 114, and thus, the rotation of the rotating member 120 is possible in the opposite direction 620 to the rotation direction 610 in which the lead is unwound.

In other words, when the companion animal suddenly runs away from the user or the user suddenly pulls on the lead, the lead is no longer stretched and the companion animal no longer moves in the direction away from the user, but rotation is possible in the rotation direction in which the lead is wound, and thus, an operation of winding the lead is possible while the user is closer to the companion animal.

On the other hand, as described above, when the rotating member 120 stops rotating in the direction in which the lead is unwound and then rotates in the opposite direction, that is, in the direction in which the lead is wound, the first latch 131 and the second latch 132 are gathered together again by the elastic member 140.

Also, when the first latch 131 and the second latch 132 are gathered together by the elastic member 140, the rotating member 120 may freely rotate again in the direction in which the lead is unwound and the direction in which the lead is wound.

On the other hand, when the rotational force by the spiral spring 150 exceeds a preset range and is applied to the lead, the first latch 131 is opened so as to be locked into some of the plurality of locking means 111, 112, 113, and 114. When the first latch 131 is locked into some of the plurality of locking means 111, 112, 113, and 114, the rotating member 120 stops rotating in the rotation direction in which the lead is wound.

For example, when the user pulls the lead and then suddenly lets off the lead, the rotational force generated by the spiral spring 150 may increase and exceed the preset range. In this case, when the lead is wound as it is, the companion animal may be impacted, and in order to prevent this, the first latch 131 is locked into some of the plurality of locking means 111, 112, 113, and 114 so that the rotating member 120 stops rotating in the rotation direction in which the lead is wound.

That is, when the rotational force generated by the spiral spring 150 exceeds the preset range and is greater than the elastic force of the first elastic body 141, in response to the rotational force generated by the spiral spring 150, the opening angle of the first latch 131 may increase so as to be locked into some of the plurality of locking means 111, 112, 113, and 114 despite the elastic force of the first elastic body 141.

Figure 7:
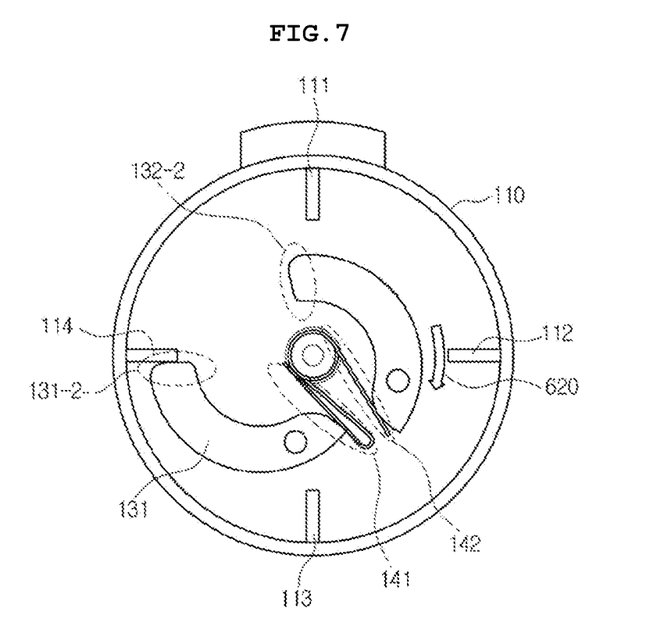
FIG. 7 is a diagram showing operations of the plurality of latches when a force exceeding a preset range is applied and the lead is wound according to an embodiment of the present disclosure.

FIG. 7 is a diagram showing operations of a plurality of latches when a force exceeding a preset range is applied and the lead is wound according to an embodiment of the present disclosure.

Referring to FIG. 7, when the rotational force generated by the spiral spring 150 exceeds the preset range, it may be seen that the opening angle of the first latch 131 increases despite the elastic force of the first elastic body 141 so that the other end 131-2 of the first latch 131 is locked into the locking means 114 among the plurality of locking means 111, 112, 113, and 114.

Accordingly, even in the direction 620 in which the lead is wound by the rotational force of the spiral spring 150, when the rotational force by the spiral spring 150 exceeds the preset range, the first latch 131 is locked into some of the plurality of locking means 111, 112, 113, and 114 so that rotation in the direction 620 in which the lead is wound may be stopped.

Therefore, when the user accidentally lets off the lead, a handle of the lead is wound inside the lead adjustment apparatus 100 controlled according to different forces for each direction, thereby preventing an accident that impacts the companion animal.

Figure 8A:
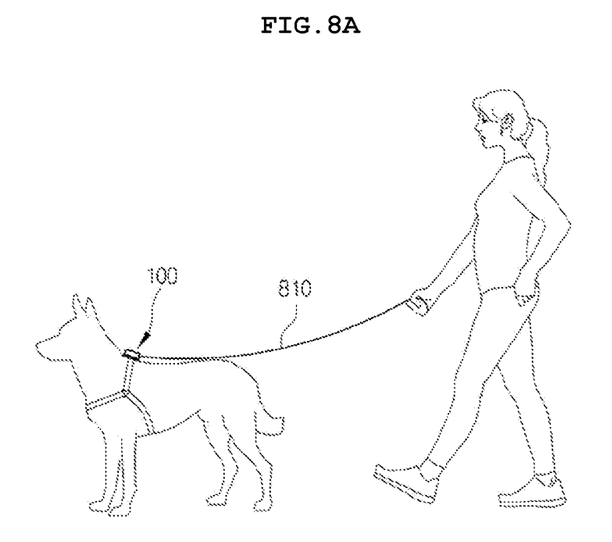
FIGS. 8A to 8C are diagrams showing various use cases of a lead adjustment apparatus controlled according to different forces for each direction.
Figure 8B:
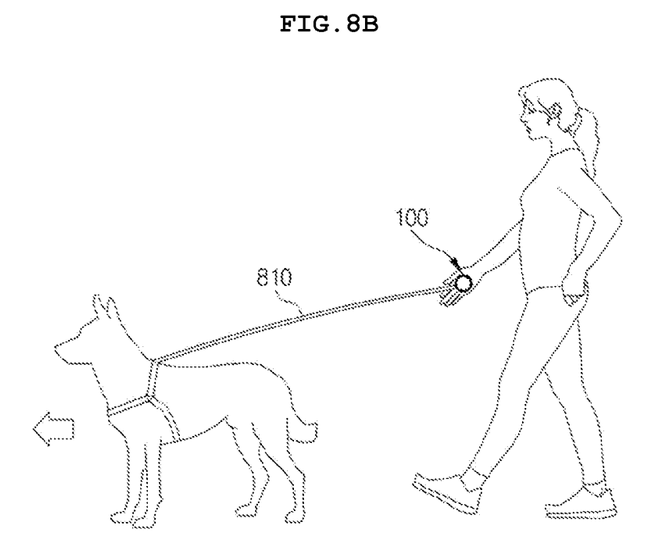
Figure 8C:
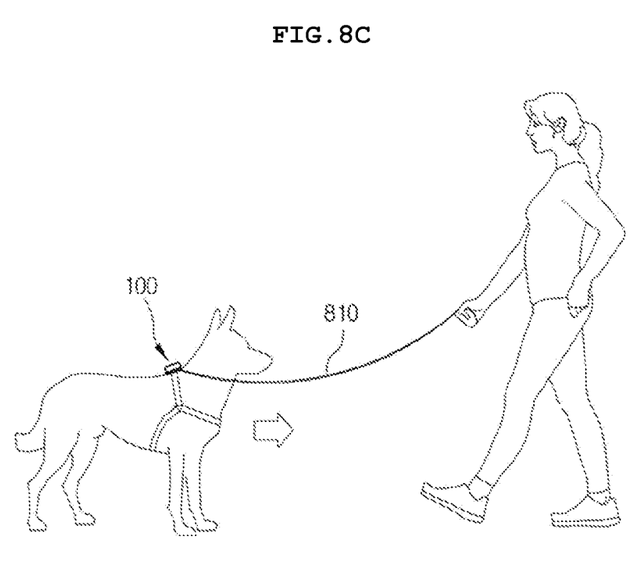

FIGS. 8A to 8C are diagrams showing various use cases of the lead adjustment apparatus controlled according to different forces for each direction.

Referring to FIG. 8A, the lead adjustment apparatus 100 controlled according to different forces for each direction according to an embodiment of the present disclosure may be attached to a component (e.g., a harness) surrounding the companion animal, and the user may control the companion animal through a lead 810 while holding the lead 810 or holding a component such as a handle connected to the lead 810 without the need for a separate apparatus.

In this case, the lead adjustment apparatus 100 controlled according to different forces for each direction may be implemented, for example, as a part of a harness, and the lead adjustment apparatus 100 controlled according to different forces for each direction may also be attached to any part of the harness without limitation. The lead adjustment apparatus 100 controlled according to different forces for each direction may be attached to not only the harness but also any article or component that may be used on the companion animal.

Referring to FIG. 8B, the lead adjustment apparatus 100 controlled according to different forces for each direction according to an embodiment of the present disclosure may be implemented in a form that the user may directly hold and use.

Even in this case, the user does not need to control the lead 810 by manipulating a separate switch or button, but may control the companion animal through the lead 810 by simply holding in the user's hand the lead adjustment apparatus 100 controlled according to different forces for each direction, through the operation of the lead adjustment apparatus 100 controlled according to different forces for each direction described above.

In particular, as shown in FIG. 8B, when the companion animal runs away from the user, the first latch 131 is locked into some of the plurality of locking means 111, 112, 113, and 114, that is, rotation of the rotating member 120 provided in the lead adjustment apparatus 100 controlled according to different forces for each direction is stopped so that the lead 810 is fixed and tightened. Accordingly, the user may retain the companion animal from running away through the tightened lead 810.

Referring to FIG. 8C, when the companion animal moves in a direction closer to the user, the first latch 131 and the second latch 132 are not locked into the plurality of locking means 111, 112, 113, and 114, that is, the rotation of the rotating member 120 provided in the lead adjustment apparatus 100 controlled according to different forces for each direction continues so that the lead 810 is not fixed or tightened, and accordingly, the companion animal may move freely.

As described above, when using the lead adjustment apparatus 100 controlled according to different forces for each direction according to an embodiment of the present disclosure, there is no need for the user to separately manipulate a button or a switch, or there is no need for the user to carry a separate lead adjustment apparatus, and in particular, when the lead is unwound, the lead may automatically stop, while when the lead is wound, the lead maintains rotation without stopping, thereby removing unnecessary stopping, and increasing user convenience.

Although technical contents have been illustrated and described hereinabove with a focus on the embodiments of the present disclosure, the present disclosure is not intended to limit the present disclosure to the disclosed embodiments, and may be variously modified by those skilled in the art to which the present disclosure pertains without departing from the scope and spirit of the present disclosure as disclosed in the accompanying claims. These modifications should not be individually understood from the technical idea of prospect of the present disclosure.

What is claimed is:

1. A lead adjustment apparatus controlled according to different forces for each direction, the lead adjustment apparatus comprising:
a cover portion comprising a plurality of locking means;
a rotating member around which a lead is wound;
a plurality of latches coupled to one side of the rotating member, and rotating with respect to the same axis as the rotating member when force of a preset range is applied to the lead, and opened so as to be locked into some of the plurality of locking means;
an elastic member allowing the plurality of latches to be gathered together; and
a spiral spring adding a rotational force to the rotating member such that the lead is wound,
wherein the plurality of latches are
controlled by the elastic member to be locked into some of the plurality of locking means when the lead is unwound and not to be locked into the plurality of locking means when the lead is wound,
wherein the elastic member includes:
a first elastic body and a second elastic body having different elastic forces, and
an elastic force of the first elastic body is greater than an elastic force of the second elastic body.

2. The lead adjustment apparatus of claim 1, wherein the plurality of latches include
a first latch disposed in contact with the first elastic body and having a shape locked into some of the plurality of locking means when the lead is wound; and
a second latch disposed in contact with the second elastic body and having a shape locked into some of the plurality of locking means when the lead is unwound,
an opening of the first latch is controlled by the first elastic body, and an opening of the second latch is controlled by the second elastic body.

3. The lead adjustment apparatus of claim 2, wherein the force of the preset range is a rotational force of a preset range by the spiral spring or force of a preset range to unwind the lead.

4. The lead adjustment apparatus of claim 3, wherein when the force of the preset range is applied to the lead, the rotating member is configured to rotate to generate a centrifugal force, and each of the first and second latches is configured to be opened in response to the generated centrifugal force, and
the first latch is configured to be opened less than the second latch due to the elastic force of the first elastic body.

5. The lead adjustment apparatus of claim 4, wherein when the force of the preset range is applied to the lead, the first latch is configured to be opened within a range not to be locked into the plurality of locking means, and the second latch is configured to be opened so as to be locked into some of the plurality of locking means.

6. The lead adjustment apparatus of claim 5, wherein in case where the rotational force of the preset range by the spiral spring is applied to the lead, the opening of the first latch is configured to be controlled by the first elastic body so that the first latch is configured to be opened within the range not to be locked into the plurality of locking means, and
in case where force of the preset range to unwind the lead is applied to the lead, the opening of the second latch is configured to be controlled by the second elastic body so that the second latch is configured to be opened so as to be locked into some of the plurality of locking means.

7. The lead adjustment apparatus of claim 6, wherein in case where force of the preset range to unwind the lead is applied to the lead, when the second latch is configured to be locked into some of the plurality of locking means, the rotating member is configured to stop rotating in a rotation direction in which the lead is unwound.

8. The lead adjustment apparatus of claim 7, wherein the first latch is configured to be not locked into the plurality of locking means, and the rotating member is configured to be rotatable in an opposite direction to the rotation direction.

9. The lead adjustment apparatus of claim 8, wherein when the rotating member stops rotating in the rotation direction and then rotates in the opposite direction, the first latch and the second latch are configured to be gathered by the elastic member.

10. The lead adjustment apparatus of claim 9, wherein when the first latch and the second latch are configured to be gathered together by the elastic member, the rotating member is configured to be freely rotatable in the rotation direction and the opposite direction.

11. The lead adjustment apparatus of claim 10, wherein when the rotational force of the preset range by the spiral spring is applied to the lead, the first latch is configured to be opened within the range not to be locked into the plurality of locking means so that the rotating member is configured to continue to rotate in the direction in which the lead is wound.

12. The lead adjustment apparatus of claim 11, wherein when the rotational force exceeding the preset range by the spiral spring is applied to the lead, the first latch is configured to be opened so as to be locked into some of the plurality of locking means, and when the first latch is locked into some of the plurality of locking means, the rotating member is configured to stop rotating in the rotation direction in which the lead is wound.

* * * * *